Patented Oct. 18, 1932

1,883,677

UNITED STATES PATENT OFFICE

KARL FREDENHAGEN AND BURCKHARDT HELFERICH, OF GREIFSWALD, GERMANY

DEGRADATION OF WOOD AND OTHER POLYSACCHARIDES

No Drawing. Original application filed March 14, 1928, Serial No. 261,701, and in Germany March 14, 1927. Divided and this application filed September 10, 1930. Serial No. 481,076.

The present invention has been divided out from our copending application Ser. No. 261,701, filed March 14, 1928, and relates to the conversion of polysaccharides, such as cellulose, starch and the like into water-soluble products by treatment with hydrofluoric acid.

We have found that valuable products are obtained by treating polysaccharides or materials containing the same, preferably in the air-dry state or after drying same, with highly concentrated solutions of hydrofluoric acid, and preferably at temperatures below the boiling point of water, until the reaction product is soluble in water even after the removal of the hydrofluoric acid. The time required for the reaction depends on the properties of the initial materials, on the presence of water in the acid and on the temperature employed. Generally speaking, it is more advantageous to work at the lowest possible temperatures and to employ the acid in a practically anhydrous state, dark colored reaction products occurring, when working at too high temperatures as above 100° C. As stated above the initial material should be generally treated in the absence of substantial amounts of water, but we have found that the effect of the present method is not affected by the presence of small quantities of water, the quantity of water present together in the acid and in the initial material not exceeding 20 per cent by weight of the initial material when in the dry state.

On working in the manner described above, different products may be obtained according to the conditions employed, as regards the concentration of the hydrofluoric acid, the length of time which it is allowed for acting upon the initial material, and other variations of performing the process, so that products may be obtained which reduce Fehling solution more or less.

The hydrofluoric acid can be removed from the reaction mass by any known manner, as by precipitation by means of calcium hydroxide or calcium carbonate or by evaporation at low temperatures. The latter method is especially advantageous when working with practically anhydrous hydrofluoric acid, which may be evaporated by passing a current of air through the reaction vessel, condensing the vapors by cooling, if desired, and directly employing the condensate in a following operation. Instead of condensing the vapors by cooling, an absorption by means of an alkali metal fluoride may be applied, the said salt being simultaneously converted into an acid fluoride, which is capable of avidly absorbing further amounts of the acid. By heating the solution or melt obtained, the acid is recovered in a practically anhydrous state. When working with hydrofluoric acid in the gaseous state, the said condensation or absorption can be dispensed with, the evaporated acid being introduced into a following operation of the present process in a sort of circulatory system. Any remainders of hydrofluoric acid which may be difficultly removable by evaporation from the reaction product, may be removed by precipitation, preferably by means of calcium hydroxide or calcium carbonate.

As initial materials not only pure polysaccharides can be employed but also materials containing such, as, for example, wood, straw or reed, or other vegetable materials may be used, all of the non-polysaccharoid constituents of such materials generally remaining undissolved. Thus, in case wood has been employed, the lignine substance is not attacked and can be separated by any known method. For example, the hydrofluoric acid may be evaporated from the reaction mixture, whereupon the water-soluble products are extracted from the resulting mass by water or other suitable solvent.

The products obtained by the present process can be employed for any purpose for which saccharids of a simpler nature are applicable, such as, for example, for the production of yeast as cattle-food. By treating the products with diluted acids, for example with diluted hydrofluoric or sulfuric acid or any other hydrolyzing agent, products can be obtained which contain considerable amounts of glucose, reduce Fehling solution in a higher degree than the original products of the degradation and can be used for similar purposes, as these are employed for.

The nature of this invention will be further illustrated by the following example to which, however, the invention is not limited. The parts are by weight.

*Example*

200 parts of anhydrous hydrofluoric acid are distilled over on to 100 parts of dry filter paper. For complete solution the mixture is stirred and kept for a quarter of an hour at room temperature. The main part of the hydrofluoric acid is then removed by means of a current of dry air. The remaining syrup is dissolved in water, and this solution is freed from the rest of the hydrofluoric acid by means of calcium carbonate. The filtrate is evaporated to dryness, preferably in vacuo. The residue weighs slightly more than the filter paper employed, contains only a small percentage of reducing sugar and is soluble in water.

If an aqueous solution of 85 per cent of hydrofluoric acid be employed for the conversion at 0° C., about 93 per cent of the initial material is obtained after a treatment of from 1 to 2 hours in form of a water-soluble substance with a reduction value corresponding to a content of 14 per cent by weight of glucose. A solution of 65 per cent of hydrofluoric acid dissolves filter paper at 50° C. in about 2 hours with a yield of only 88 per cent of water-soluble substance, the reduction value of which corresponds to a content of 60 per cent by weight of glucose.

What we claim is:—

1. A process for the production of water-soluble degradation products of polysaccharides, which comprises acting upon a material containing polysaccharides with a concentrated solution of hydrofluoric acid at a temperature below 100° C., the quantity of water present in the acid and in the material to be acted upon being less than 20 per cent of water by weight of the initial material when in the dry state, and removing the hydrofluoric acid after the reaction.

2. A process for the production of water-soluble degradation products of polysaccharides, which comprises acting upon a material containing polysaccharides with a concentrated solution of hydrofluoric acid at a temperature below 100° C., the quantity of water present in the acid and in the material to be acted upon being less than 20 per cent of water by weight of the initial material when in the dry state, removing the hydrofluoric acid after the reaction and carrying on the degradation of the water-soluble products obtained, by heating them with a solution of a hydrolyzing agent after removal of the hydrofluoric acid.

3. A process for the production of water-soluble degradation products of polysaccharides, which comprises acting upon a material containing polysaccharides with a concentrated solution of hydrofluoric acid at about 0° C., the quantity of water present in the acid and in the material to be acted upon being less than 20 per cent of water by weight of the initial material when in the dry state, and removing the hydrofluoric acid after the reaction.

4. A process for the production of water-soluble degradation products of polysaccharides, which comprises acting upon a material containing polysaccharides with an aqueous solution of hydrofluoric acid of about 85 per cent strength at a temperature below 100° C., the quantity of water present in the acid and in the material to be acted upon being less than 20 per cent of water by weight of the initial material when in the dry state, and removing the hydrofluoric acid after the reaction.

5. A process for the production of water-soluble degradation products of polysaccharides, which comprises acting upon a material containing polysaccharides with an aqueous solution of hydrofluoric acid of about 85 per cent strength at 0° C., the quantity of water present in the acid and in the material to be acted upon being less than 20 per cent of water by weight of the initial material when in the dry state, and removing the hydrofluoric acid after the reaction.

In testimony whereof, we affix our signatures.

KARL FREDENHAGEN.
BURCKHARDT HELFERICH.